May 16, 1933. R. K. JEFFREY 1,909,830
DRILL
Filed May 5, 1931
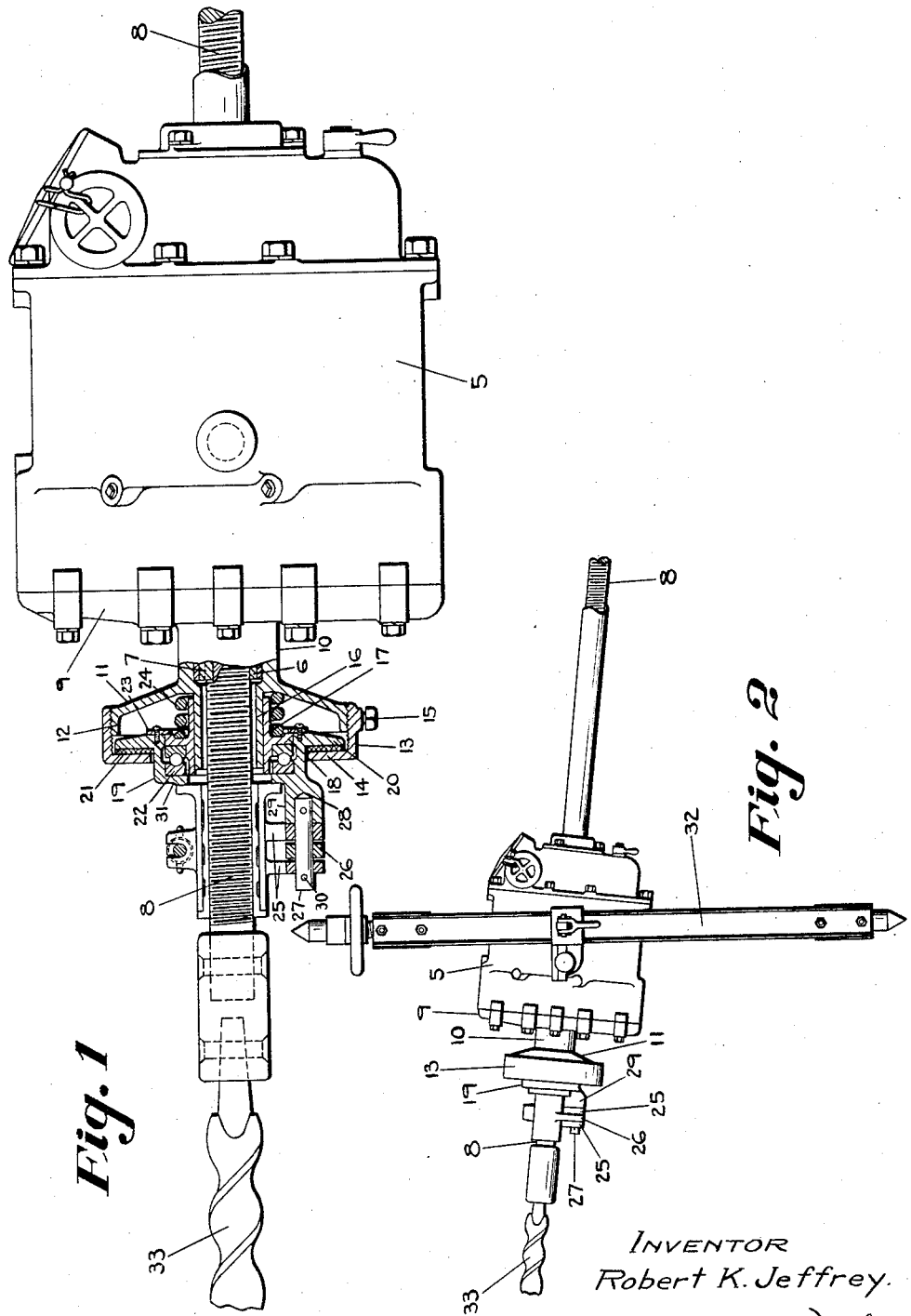
INVENTOR
Robert K. Jeffrey.
By Cushman-Bryant Warley
attys Patented May 16, 1933

1,909,830

UNITED STATES PATENT OFFICE

ROBERT K. JEFFREY, OF COLUMBUS, OHIO, ASSIGNOR TO THE JEFFREY MANUFACTURING COMPANY, OF COLUMBUS, OHIO, A CORPORATION OF OHIO

DRILL

Application filed May 5, 1931. Serial No. 535,279.

The present invention relates particularly to drills of the type employing a rotatable feed screw engaging a nut which is normally held stationary. Heretofore, a friction band has been provided for holding the nut up to a certain point where slippage may occur, as when the auger encounters an obstacle.

The band is tensionable by means of a thumb nut and it is largely left to the judgment of the drill operator as to whether or not the band is set so as to permit slippage at the proper point. Further, when slippage has occurred, the thumb nut must be again regulated in order that feed may be resumed at the normal rate.

According to the present invention, I provide means for connecting the nut with a stationary support, which means are automatically disengaged when resistance to the advance of the screw passes a predetermined maximum which is determined by the strength of a spring which holds the means in engagement. Preferably, the connecting means take the form of friction rings secured to the nut and drill casing respectively, the spring acting on the ring associated with the nut in the advancing direction of the screw. When a resistance is encountered which retards the normal feed of the screw, the nut tends to ride back on the feed screw, thus overcoming the force of the spring and disengaging, or partially disengaging, the connecting means between it and the casing. In case of partial disengagement of the rings so that one slips relative to the other but still rotates at a speed less than that of the screw, the advance of the screw relative to the nut will be accordingly retarded. In case of complete disengagement of the rings, the nut will rotate with the screw at the speed of the latter and the screw will be pressed forward under the action of the spring until penetration of the obstacle permits the rings to come again into full engagement whereupon normal feed is resumed.

In the drawing I have shown a practical embodiment of the invention for purposes of illustration, although it will be understood that the invention may take numerous other forms without departure from its scope. In the drawing:

Figure 1 is a side elevation of a drill embodying the present invention, the connecting means between the nut and drill casing being shown in section; and Figure 2 is a side elevation of the drill mounted for operation.

Referring to the drawing, reference numeral 5 designates a drill casing which in the well known manner, houses an electric motor adapted to impart rotation to a quill 6 provided interiorly with keys as at 7 which are slidably engaged in grooves formed in a feed screw 8 which is slidable in the quill. Ordinarily means are provided for reversing the direction of rotation of the quill, although this feature is immaterial to the present invention and may be used or not, as desired.

The casing 5 has an end cover 9 provided with an integral neck 10 which surrounds the feed screw. Outwardly of the cover, the neck is provided with a circumferential flange 11 having an externally threaded cylindrical portion 12 upon which is threaded a cylindrical member 13 having integral therewith an inwardly projecting radial flange 14 which constitutes a friction ring. Rotation of member 13 relative to member 11 is prevented by means of a set screw 15. The members just mentioned constitute a head in which is housed the control means for the feed nut.

A sleeve 16, in continuation of the neck 10 extends through the head somewhat beyond ring 14. Rotatably mounted on the sleeve 16 is a collar 17 which has a radially expanded circular flange 18 integral therewith. An annular member 19 has a cup-like portion extending within the head and radially expanded at its inner edge to form a friction ring 20 lying behind ring 14, a friction washer 21 being interposed between the two rings. A ball bearing assembly 22 is interposed between flange 18 and a radial wall of the annular member 19, the disposition being such that ring 21 is concentric with flange 19 to be centered by the latter.

An annulus 23 is fixed to the inner margins of ring 20 and overlies the outer margins of flange 18 to hold the parts in assembled relation. A spring 24 interposed between flanges 11 and 18 serves to hold ring 21 against ring 14 through the intermediary of the ball bearing assembly.

A split nut of well known construction has its two halves pivoted by means of knuckles 25 and 26 on a pin 27 which is secured in a recess 28 formed in a boss 29 which projects outwardly of the annular member 19. The knuckles are retained on pin 27 by means of a cotter pin 30 and the base of the nut is adapted to rest on a shoulder 31 of the annular member.

In mine work, casing 5, through suitable mounting means, is supported on a jack 32, the upper and lower ends of the jack being respectively engaged with the roof and floor of the mine so that the casing is rigidly supported against rearward reactions of the feed screw. The speed of the feed screw and its pitch are so related as to give the proper rate of advance to the auger 33 which is supported at the end of the feed screw. The rate at which the auger may be advanced depends, of course, upon the nature of the material to be drilled. When the auger encounters a mass which it cannot penetrate at its usual rate of advance, the feed nut rides back on the feed screw, carrying with it annular member 19, against the force of spring 24, thereby disengaging the friction rings so that the nut may rotate with the feed screw. The spring 24 reacting against the rigidly supported casing 5 is now the sole advancing medium for the auger and remains so until the auger has penetrated the obstacle, whereupon ring 21 is again engaged with ring 14, the rotation of the feed nut is arrested, and normal feeding is resumed.

While the described construction is very simple, it is evident that it is most efficient in operation, since it relieves the auger of positive advance when an obstacle is encountered and substitutes impositive feeding pressure until the obstacle is overcome. While the described friction connection between the nut and feed screw support is preferable, I do not limit myself to this construction and, of course, many other variations may be made without departure from the invention as defined in the following claims.

I claim:—

1. In a drill, a feed screw, means for slidably supporting said feed screw, means for rotating said feed screw, a nut on said feed screw, and friction rings having engaged radial friction faces surrounding the feed screw and establishing a frictional connection between the nut and supporting means to yieldably prevent rotation of the former relative to the latter, said rings being separable upon abnormal reaction of the screw to enable the nut to be rotated by the latter.

2. In a drill, a feed screw, means for slidably supporting said feed screw, means for rotating said feed screw, a friction ring surrounding said feed screw in connection with said supporting means, a feed nut on the forward portion of said feed screw outwardly of said ring, a friction ring in connection with said nut and surrounding said feed screw, and a spring, said last named ring being engaged behind the first and urged thereagainst by said spring.

3. In a drill, a feed screw, means for slidably supporting said feed screw, means for rotating said feed screw, a friction ring surrounding said feed screw in connection with said supporting means, a nut on the forward portion of said feed screw outwardly of said ring, a friction ring in connection with said nut and surrounding said feed screw, a spring, said last named ring being engaged behind the first and urged thereagainst by said spring, and an anti-friction bearing interposed between the spring and said last named ring.

4. In a drill, a feed screw, means for slidably supporting said feed screw, a sleeve in connection with said support and surrounding said feed screw, a nut on said feed screw, an annular member surrounding said feed screw in connection with said nut, and movable axially of the screw, means on said sleeve for centering said annular member relative to the feed screw, frictionally engaged elements in respective connection with said supporting means and said annular member, spring means holding said elements in engagement and means for rotating the feed screw.

5. In a drill, a feed screw, means for slidably supporting said feed screw, means for rotating said feed screw, a head on said supporting means through which the forward end of the feed screw passes, said head including a ring having an inner friction face, a movable friction ring within the head, a spring normally urging said rings into engagement, a nut on the feed screw, and means connecting the nut with said movable ring to prevent their relative rotation, abnormal reactive force transmitted to the nut by the said screw causing disengagement of the rings.

6. In a drill, a feed screw, means for slidably supporting the feed screw, means for rotating the feed screw, a head on said supporting means through which the forward end of the feed screw passes, said head including a ring having an inner friction face, an annular member freely surrounding the screw and projecting within said ring, said annular member having a radially expanded portion constituting a friction ring behind the first ring, a compression spring acting on said annular member in a direction away from the supporting means and causing mutual engagement of the friction rings, a nut on said feed screw, and means connecting the nut and annular member to prevent their relative rotation.

7. In a drill, a feed screw, means for slidably supporting the feed screw, means for rotating the feed screw, a head on said supporting means through which the forward end of the feed screw passes, said head including a ring having an inner friction face, an annular member freely surrounding the screw and projecting within said ring, said annular member having a radially expanded portion constituting a friction ring behind the first ring, a compression spring acting on said annular member in a direction away from the supporting means and causing mutual engagement of the friction rings, an anti-friction bearing between the spring and said annular member, a nut on said feed screw, and means connecting the nut and annular member to prevent their relative rotation.

8. In a drill, a feed screw, means for slidably supporting said feed screw, means for rotating the feed screw, a head on said supporting means through which the forward end of the feed screw passes, said head including a ring having an inner friction face, a sleeve surrounding the screw within the head and fixed to the latter, a radial flange on said sleeve, an annular member freely surrounding the shaft and projecting within said ring, said annular member having a radially expanded portion constituting a friction ring behind the first ring and concentric with said radial flange to be centered thereby, a compression spring interposed between said flange and the head to the rear of the flange, an anti-friction bearing between the flange and said annular member, a nut on the feed screw, and means connecting the nut and annular member to prevent their relative rotation.

9. In a drill, a fixed support, a feed screw slidably mounted in said support, means to rotate the feed screw, a feed nut axially displaceable under extraordinary reaction of the screw, disengageable means normally connecting the nut and support whereby upon rotation of the feed screw the same is advanced, said connecting means being automatically disengaged upon axial displacement of the nut.

10. In a drill, a fixed support, a feed screw slidably mounted in said support, means to rotate the feed screw, a feed nut axially displaceable upon extraordinary reaction of the screw, disengageable means normally connecting the nut and support whereby upon rotation of the feed screw the same is advanced, and a spring effecting engagement of said releasable means, the force of the spring being overcome to disengage the connecting means upon the axial displacement of the nut.

11. In a drill, a fixed support, a feed screw slidably mounted in said support, means for rotating the feed screw, a feed nut, disengageably engaged members coaxial with the shaft and in connection with the nut and support respectively whereby upon rotation of the feed screw the same is advanced, the member in connection with the nut lying behind the other member, and a spring behind the first specified member and normally causing its engagement with the other, resistance to screw advance beyond a certain maximum overcoming the spring and effecting disengagement.

12. In a drill, a fixed support, a feed screw slidably mounted in said support, mechanism for rotating the screw, a feed nut on the screw, disengageable means normally engaged for holding said nut against rotation relative to the support, said means being disengageable upon relative displacement thereof axially of the screw whereupon the nut is enabled to be rotated by the screw, and spring means for effecting the normal engagement of said means.

13. In a drill, a fixed support, a feed screw slidably mounted in said support, mechanism for rotating the screw, a feed nut on the screw, disengageable means normally engaged for holding said nut against rotation relative to the support, said means being disengageable upon relative displacement thereof axially of the screw whereupon the nut is enabled to be rotated by the screw, spring means for effecting the normal engagement of said means, and an anti-friction bearing interposed between the nut and the displaceable disengageable means.

14. In a drill, a fixed support, a feed screw slidably mounted in the support, mechanism for rotating the screw, a feed nut on the screw, disengageable friction elements normally engaged for holding said nut against rotation relative to the support, one of said elements being displaceable axially of the screw relative to the other whereupon, disengagement of the elements being completed, the nut is immediately free to be rotated by the screw, and spring means for effecting the normal engagement of said elements.

15. In a drill, a fixed support, a feed screw slidably mounted in the support, mechanism for rotating the screw, a feed nut on the screw, disengageable friction elements normally engaged for holding said nut against rotation relative to the support, one of said elements being displaceable axially of the screw relative to the other whereupon, disengagement of the elements being completed, the nut is immediately free to be rotated by the screw, and an anti-friction bearing interposed between the nut and the displaceable element.

In testimony whereof I have hereunto set my hand.

ROBERT K. JEFFREY.